(12) United States Patent
Du et al.

(10) Patent No.: US 6,823,357 B1
(45) Date of Patent: Nov. 23, 2004

(54) SYSTEM FOR AUTOMATING EVENT SCHEDULING AND SUBSCRIPTION USING AN HTTP BASED EVENT PUBLISH SERVER

(75) Inventors: John Du, Beaverton, OR (US); Rajiv Choudhary, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 712 days.

(21) Appl. No.: 09/604,160

(22) Filed: Jun. 27, 2000

(51) Int. Cl.[7] .............................................. G06F 15/16
(52) U.S. Cl. ...................... 709/203; 709/206; 345/853; 345/854
(58) Field of Search ............................... 709/203, 206; 345/853, 854, 963

(56) References Cited

U.S. PATENT DOCUMENTS

| | | | | |
|---|---|---|---|---|
| 6,018,343 A | * | 1/2000 | Wang et al. | 345/733 |
| 6,144,942 A | * | 11/2000 | Ruckdashel | 705/9 |
| 6,185,613 B1 | * | 2/2001 | Lawson et al. | 709/224 |
| 6,216,110 B1 | * | 4/2001 | Silverberg | 705/9 |
| 6,369,840 B1 | * | 4/2002 | Barnett et al. | 345/853 |
| 6,466,969 B1 | * | 10/2002 | Bunney et al. | 709/206 |
| 6,574,630 B1 | * | 6/2003 | Augustine et al. | 707/10 |

* cited by examiner

*Primary Examiner*—Viet D. Vu
*Assistant Examiner*—Jinsong Hu
(74) *Attorney, Agent, or Firm*—Pillsbury Winthrop LLP

(57) ABSTRACT

A system and method of publicizing a schedule of upcoming events over the Internet. Visitors to an events website are able to browse various schedules of upcoming events, called events pages, publicize by the entities that are sponsoring the events. Furthermore, such visitors may become a subscriber of one or more events pages that he/she has an interested in. Once the visitor becomes a subscriber, he/she may receive automatic notification via e-mail when the events page(s) that he/she has subscribed to is/are updated or changed. Additionally, if the subscriber has a commercially available Internet-linked calendar or obtains a subscriber calendar, this invention allows such subscribers to automatically update their Internet-linked calendar or subscriber calendar to comprise the events contained in the events page(s) they have subscribed to.

38 Claims, 10 Drawing Sheets

US 6,823,357 B1

SYSTEM FOR AUTOMATING EVENT SCHEDULING AND SUBSCRIPTION USING AN HTTP BASED EVENT PUBLISH SERVER

BACKGROUND OF THE INVENTION

1. Field of the Invention

This invention generally relates to event publishing notification. More particularly, this invention relates to a novel system and method that publishes and notifies individuals of events over the Internet and automatically updates personal calendars of individuals interested in such publicized events.

2. Description of Related Art

Organizers of events, such as, meetings, conferences, and seminars, for example, have increasingly utilized the Internet to notify their intended participants of these events. It is not uncommon for event organizers to announce events via e-mail. Typically, upon receiving information regarding an event of interest, individuals manually input such events into their personal calendars. For example, many individuals utilize the calendar feature of the well known e-mail application, Microsoft® Outlook™, to keep track of such events.

For busy individuals, the manual entry of noteworthy events maybe inconvenient, time consuming, tedious, and prone to errors. In addition, entered events may be difficult to update or modify if the events get rescheduled or canceled.

Thus, what is needed is a method and system that enables individuals to automatically update their personal calendars with events of interest as well as allow event organizers to publicize and forward event-related information.

BRIEF DESCRIPTION OF THE DRAWINGS

The accompanying drawings, which are incorporated in and constitute a part of this specification, illustrate the invention, and together with the description, explain the objects, advantages, and principles of the invention. In the drawings.

DETAILED DESCRIPTION

The following detailed description of an embodiment of the invention refers to the accompanying drawings. Other embodiments are possible and modifications may be made to the embodiment without departing from the spirit and scope of the invention. Therefore, the following detailed description is not meant to limit the invention. Rather the scope of the invention is defined by the appended claims.

Figure 1:
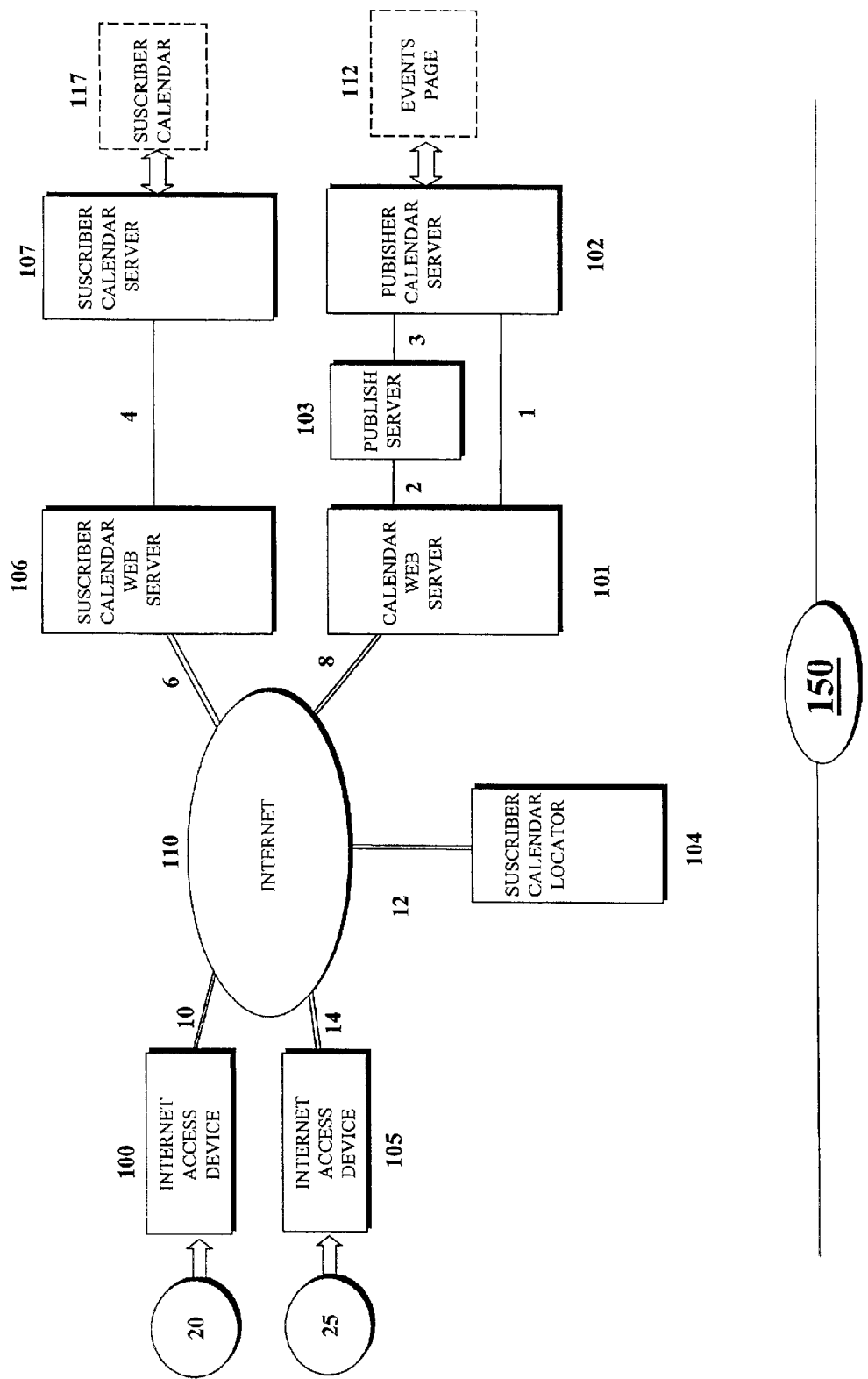
FIG. 1 is a conceptual block diagram depicting an event publishing system in accordance with an embodiment of the present invention.

FIG. 1 presents a conceptual overview of the event publishing system 150, constructed and operative in accordance with an embodiment of the present invention. As indicated in FIG. 1, system 150 incorporates an Event Publisher 20, which uses Internet access device 100 to access the Internet 110. Event Publisher 20 may be any entity that utilizes system 150 to publicize events. The Internet access device 100 may comprise a desktop personal computer, a laptop personal computer, a cellular telephone, a personal digital assistant (PDA) or a Windows CE device. Other devices may be employed as long as they have the capability to access and "surf" the Internet using an Internet browser. Internet access device 100 accesses the Internet via data link 10. Data link 10 may be a telephone line, dedicated computer connection, a satellite connection, a cellular telephone network connection, or any other data connection capable of accessing the Internet.

Event Publisher 20 may access and communicate with Calendar Web Server 101 using an Internet browser. Calendar Web Server 101 may be configured to store, manage, and permit access to events and is linked to the Internet 110 via data link 8. As stated above with respect to data link 10, data link 8 may be a telephone line, a dedicated computer connection, a satellite connection, a cellular telephone network connection, or any other data connection capable of accessing the Internet. Calendar Web Server 101 may also include software to restrict access to other entities of system 150.

Calendar Web Server 101 may be linked to Publisher Calendar Server 102. Publisher Calendar Server 102 stores Events Page 112, which corresponds to Event Publisher 20. Events Page 112 may comprise a list of events that Event Publisher 20 desires to publicize to a specific group or to the general public. Events Page 112 may also contain information regarding each event, such as description of the event, location and direction to the location of the event, etc. Event Publisher 20 may employ Publish Server 103 to update Events Page 112 and may do so by adding or deleting events, changing the schedule of events, adding and/or editing the information pertaining to the events stored on Events Page 112, etc. As indicated in FIG. 1, Publisher Calendar Server 102 and Publish Server 103 are linked to the Calendar Web Server 101 via data link 1 and data link 2, respectively.

Publisher Calendar Server 102 is linked to Publish Server 103 via data link 3. Data links 1–3 may be configured in accordance with well-known protocols, such as, HTTP (Hyper Text Transport Protocol) or TCP (Transport Control Protocol). Event Publisher 20 may restrict access to Events Page 112 stored in the Publisher Calendar Server 102 to a specific group of persons or entities called subscribers. Calendar Web Server 101 may be configured to deny access to any non-subscriber if Event Publisher 20 has restricted access to Events Page 112 to his subscribers only. Each subscriber may enter a user identification, assigned by Event Publisher 20, and a password, individually chosen by each subscriber, before the Calendar Web Server 101 will grant access to a restricted events page. A subscriber's user identification may be his e-mail address. Both Event Publisher 20 and Event Publisher's 20 subscribers may view the Events Page 112 stored in the Calendar Web Server 102. However, only Event Publisher 20 may access the Publish Server 103 to update the Events Page.

In the illustrated embodiment, Events Page 112 is a restricted events page. However, depending on the events that Event Publisher 20 desires to publicize, Event Publisher 20 may allow the general public to access Events Page 112 by designating Events Page 112 as an unrestricted events page. In such a case, Calendar Web Server 101 will allow the public to access Events Page 112 without requiring a valid user identification and password to be entered. The public may browse all of the unrestricted events pages stored in the Publisher Calendar Server 102.

After Event Publisher 20 updates Events Page 112, Event Publisher 20 activates Publish Server 103 to forward an update message signal to Subscriber Calendar Locator 104, via Calendar Web Server 101 and the Internet 110, respectively. As such, Event Publisher 20 directs Subscriber Calendar Locator 104 to update the personal calendars of his Automatic subscribers and to notify his Automatic and Non-Automatic subscribers of his updated Events Page 112 via e-mail. Subscriber Calendar Locator 104 may determine whether each of Event Publisher's 20 subscribers are Automatic or Non-Automatic subscribers.

Returning to FIG. 1, system 150 further includes Subscriber Calendar Web Server 106, which manages and controls access to Subscriber Calendar Server 107. Subscriber Calendar Server 107 is linked to the Subscriber Calendar Web Server 106 via data link 4. Data link 4 is configured as an HTTP or TCP link. Subscriber Calendar Web Server 106 is linked to the Internet 110 by data link 6. As noted above with respect to data links 8, 10, data link 6 may be a telephone line, a dedicated computer connection, a satellite connection, a cellular telephone connection, or any other data connection.

Subscriber Calendar Server 107 stores Subscriber Calendar 117. Subscriber Calendar 117 is a personal calendar that represents the daily, weekly, monthly or yearly schedules of Subscriber 25. Each subscriber maintains his own personal calendar. In this example, Subscriber 25 maintains a personal calendar that is stored in Subscriber Calendar Server 107. However, Subscriber 25 may utilize a commercially available Internet-linked calendar such as Microsoft® Outlook™ or Yahoo® Calendar in conjunction with this invention.

Subscriber 25 may access Subscriber Calendar 117, stored on the Subscriber Calendar Server 107, using an Internet access device 105. Internet access device 105 may be configured much like any of the devices described above for Internet access device 100. The only difference between Internet access device 105 and Internet access device 100 is that the former is used by Subscriber 25 and the latter is used by Event Publisher 20. Internet access device 105 is linked to the Internet via data link 4. Much like links 10, 8 and 6, data link 4 may be a telephone line, a dedicated computer connection, a satellite connection, a cellular telephone connection, or any other data connection.

Using the Internet browser associated with Internet access device 105, Subscriber 25 may access the Subscriber Calendar Web Server 106. After entering his user identification and password, Subscriber 25 may access Subscriber Calendar 117 stored in the Subscriber Calendar Server 107, after entering his user identification and password. Subscriber 25 may then edit and update his Subscriber Calendar 117 by manually entering information associated with events of interest to him. However, the information associated with the events listed on the updated Events Page 112 may be automatically added to Subscriber Calendar 117. Subscriber's 25 Subscriber Calendar 117 may be updated with information pertaining to Event Page 112 without any manual operation by Subscriber 25. For example, upon receiving updated Events Page 1112, information from Publish Server 103, Subscriber Locator 104 locates Subscriber Calendar 117.

Subscriber data pertaining to each Subscriber 25 is stored in Subscriber Calendar Server Locator 104. The subscriber data includes the location and type of personal calendar each subscriber utilizes, and whether each subscriber is an Automatic or a Non-Automatic subscriber. Each Subscriber 25 may utilize a personal calendar stored on the Subscriber Calendar Server 107 or may utilize a commercially available Internet-linked calendar, such as Microsoft® Outlook™ or Yahoo® Calendar, for example.

After successfully locating Subscriber Calendar 117, an update message signal, corresponding to the updated data, is transferred from Subscriber Calendar Locator 104 to the Internet 110 via data link 12, and then to Subscriber Web Calendar Server 106 via data link 6. Subscriber Calendar Web Server 106 will transfer the update message signal corresponding to the updated data to the Subscriber Calendar Server 107.

Subscriber Calendar Server 107 comprises a storage device which stores a plurality of Subscriber Calendars associated with a plurality of subscribers. The update message signal includes data identifying Subscriber Calendar 117 as the personal calendar to be updated. The update message signal also includes commands instructing Subscriber Calendar Web Server 106 to update Subscriber Calendar 117. Subscriber Calendar Web Server 106 may update Subscriber Calendar 117, stored in Subscriber Calendar Server 107, by adding, deleting, and editing dates and information pertaining to the Event Publisher's 20 updated Events Page 112.

If Subscriber 25 utilizes a commercially available Internet-linked calendar, and not one stored on the Subscriber Calendar Server 107, Subscriber Calendar Server 107 may convert the update message signal into a format that corresponds to the type of personal calendar Subscriber 25 is utilizing. Server 107 will forward an update message signal to Subscriber's 25 commercially available Internet-linked calendar, via Server 106 and the Internet 110, respectively, to update the subscriber's calendar in accordance with the updated Events Page 112.

Figure 2:
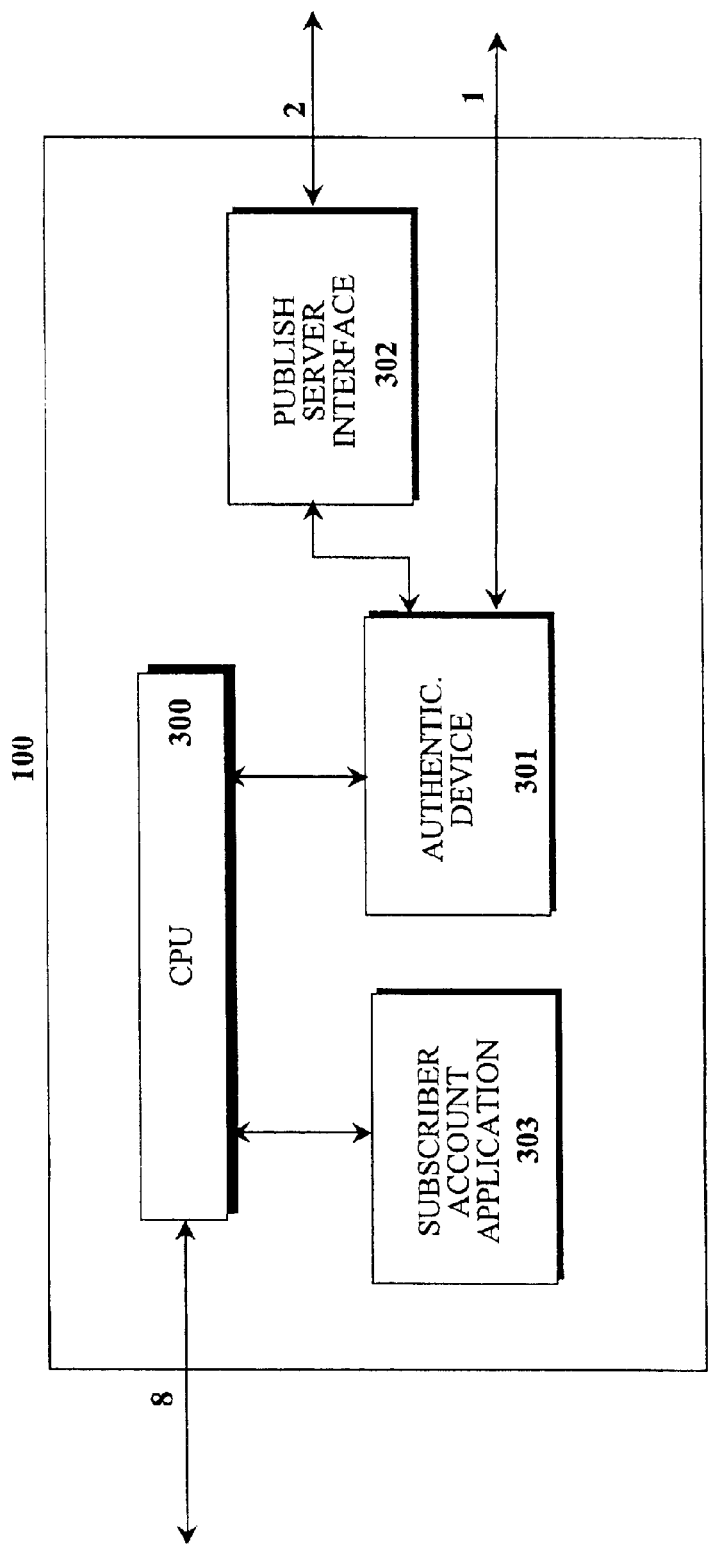
FIG. 2 is a functional block diagram depicting features of a Calendar Web Server in accordance with an embodiment of the present invention.

FIG. 2 illustrates the main components of Calendar Web Server 101. Calendar Web Server 101 comprises CPU 300 that is linked to the Internet 110 via data link 8. CPU 300 is linked to and controls the operations of Authentication device 301, Publish Server Interface 302, and Subscriber Account Application. CPU 300 receives a data signal corresponding to the commands of Event Publisher 20, Subscriber 25, or a non-subscribing member of the public who is visiting a Publisher Calendar website. Calendar Web Server 101 controls and operates the Publisher Calendar website. The Publisher Calendar website displays links to unrestricted events pages that non-subscribing members of the general public may access. The website may also contain links for Subscriber 25 and Event Publisher 20 to access restricted events pages.

The Publisher Calendar website may comprises a link (e.g. HTTP) inviting non-subscribing visitors to become subscribers to unrestricted events pages and activating accounts for subscribers who have access to restricted events pages. After activating (e.g., clicking on the link), Subscriber Account Application 303 enables CPU 300 to display instructions for activating a new subscriber account and enables CPU 300 to activate the new subscriber's account. Each restricted and unrestricted events page comprises a link for Non-Automatic subscribers to update their personal calendar utilizing the Calendar Update Operation as described below. Subscriber Account Application 303 enables CPU 300 to initiate the Calendar Update Operation.

Subscriber Account Application 303 comprises Wallet application software, which may be downloaded as a step of setting up a new subscriber account. Preferably, Subscriber 25 downloads Wallet application software. The Wallet application maintains and stores personal and user data pertaining to Subscriber 25. Data maintained by the Wallet application may include, for example, user name, address, telephone numbers, e-mail addresses, user authentication information for authenticating the user to different web servers/applications, credit card information, brand of Internet-linked commercial calendar being utilized, whether Subscriber 25 desires to be an Automatic or Non-Automatic subscriber, Internet address of Internet-linked commercial calendar, and/or Subscriber Calendar 117.

Upon being installed in the Subscriber's 25 Internet access device 105, the Wallet application instructs the central processing unit (CPU) in Internet access device 105 to forward the subscriber data to Subscriber Calendar Server Locator 104. The subscriber data will be store in Subscriber Calendar Server Locator 104.

Authentication device 301 verifies whether the user identification and password entered by Subscriber 25 and Event Publisher 20 are valid. If the user identification and password entered by Subscriber 25 is valid, Authentication device 301 will allow Subscriber 25 access to Publisher Calendar Server 102 via data link 1. If the user identification and password entered by Event Publisher 20 is valid, Authentication device 301 will allow Event Publisher 20 access to Publish Server interface 302, which is linked to Authentication device 301.

Figure 3:
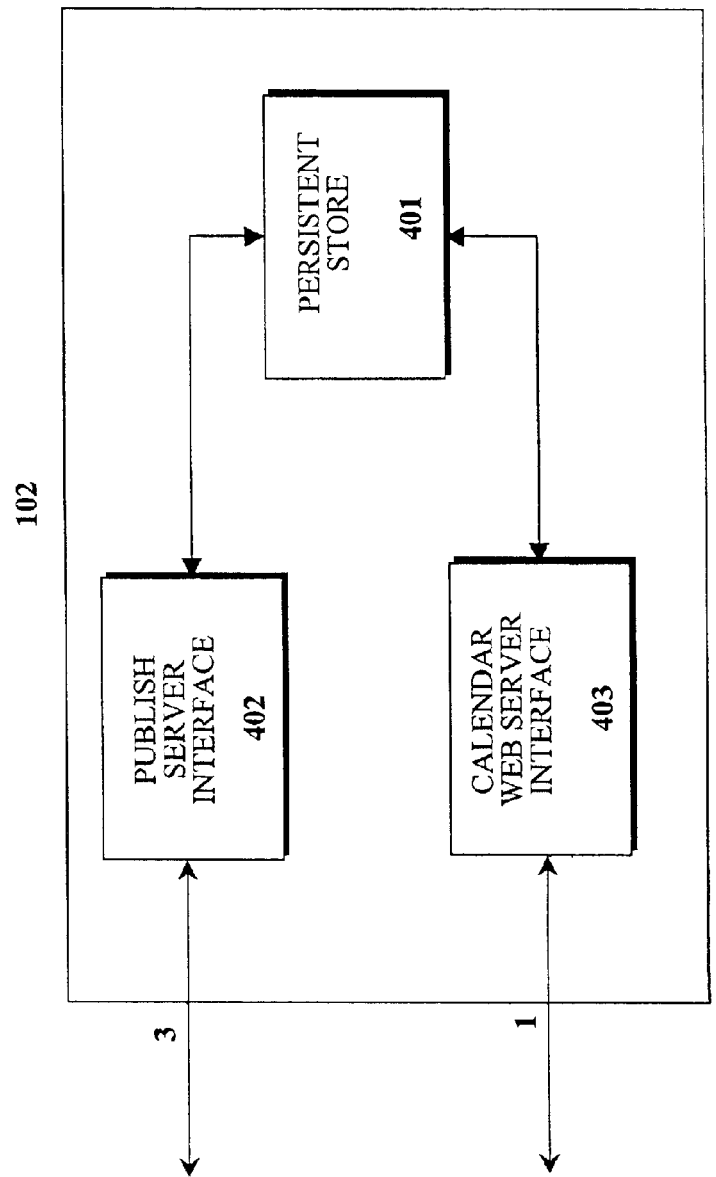
FIG. 3 is a functional block diagram depicting features of a Publisher Calendar Server in accordance with an embodiment of the present invention.

FIG. 3 illustrates the main components of Publisher Calendar Server 102. Publisher Calendar Server 102 comprises Publish Server Interface 402, which is linked to Publish Server 103 via data link 3. Publish Server Interface 402 allows the Publish Server 103 and Publisher Calendar Server 102 to exchange information. Publish Server Interface 402 may be linked to Persistent store 401, which is a memory device such as a hard drive, that stores a plurality of events pages belonging to a plurality of event publishers. Persistent store 401 is also linked to Calendar Web Server interface 403. Calendar Web Server Interface 403 enables Publisher Calendar Server 102 and Calendar Web Server 101 to exchange information. Calendar Web Server interface 403 may be linked to Calendar Web Server 101 via data link 1.

Figure 4:
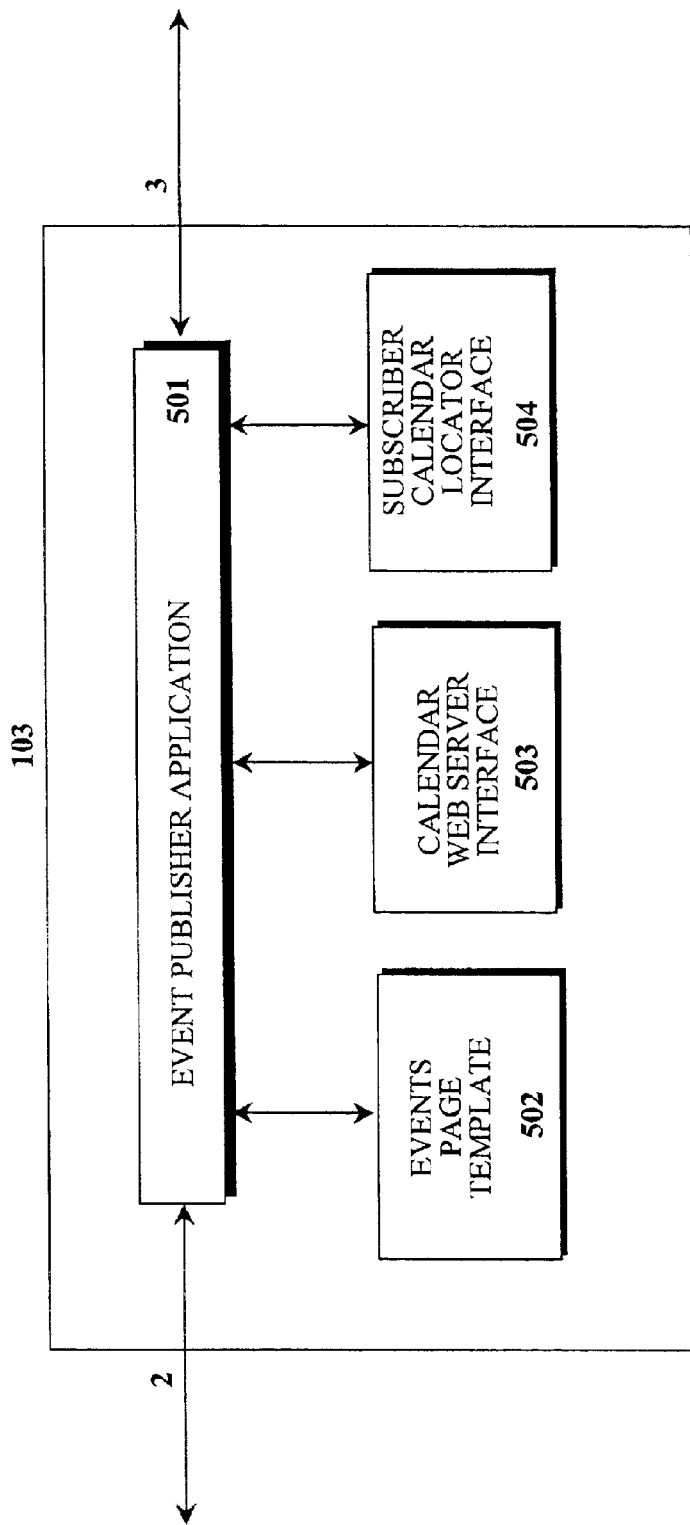
FIG. 4 is a functional block diagram depicting features of a Publish Server in accordance with an embodiment of the present invention.

FIG. 4 illustrates the main components of Publish Server 103. Publish Server 103 comprises Event Publisher Application device 501, which may be linked to Calendar Web Server 104 via data link 2. Event Publisher Application device 501 is further linked to and controls the operations of Events Page Template 502, Calendar Web Server Interface 503, and Subscriber Calendar Locator interface 504.

Event Publisher Application device 501 allows Event Publisher 20 to view and edit his Events Page 112, which is stored in Persistent Store 401. Event Publisher Application device 501 also allows Event Publisher 112 to create new events pages if so desired. Event Publisher Application device 501 is linked to Publisher Calendar Server 102 via data link 3 as well as being linked to Event Page Template 502. Event Page Template 502 contains a plurality of events page templates, which Event Publisher 112 may use to alter the appearance of Events Page 112 or to create and design new events pages.

Calendar Web Server interface 503 and Subscriber Calendar Locator interface 504 may both be linked to Event Publisher Application device 501. Calendar Web Server Interface 503 enables Event Publisher Application device 501 to exchange information with Calendar Web Server 101. Subscriber Calendar Locator interface 504 enables Event Publisher Application device 501 to transfer a data signal corresponding to the updated Events Page 112 or a new events page created by Event Publisher 20 to Subscriber Calendar Locator 104, via Server 101 and the Internet 110, respectively.

Figure 5:
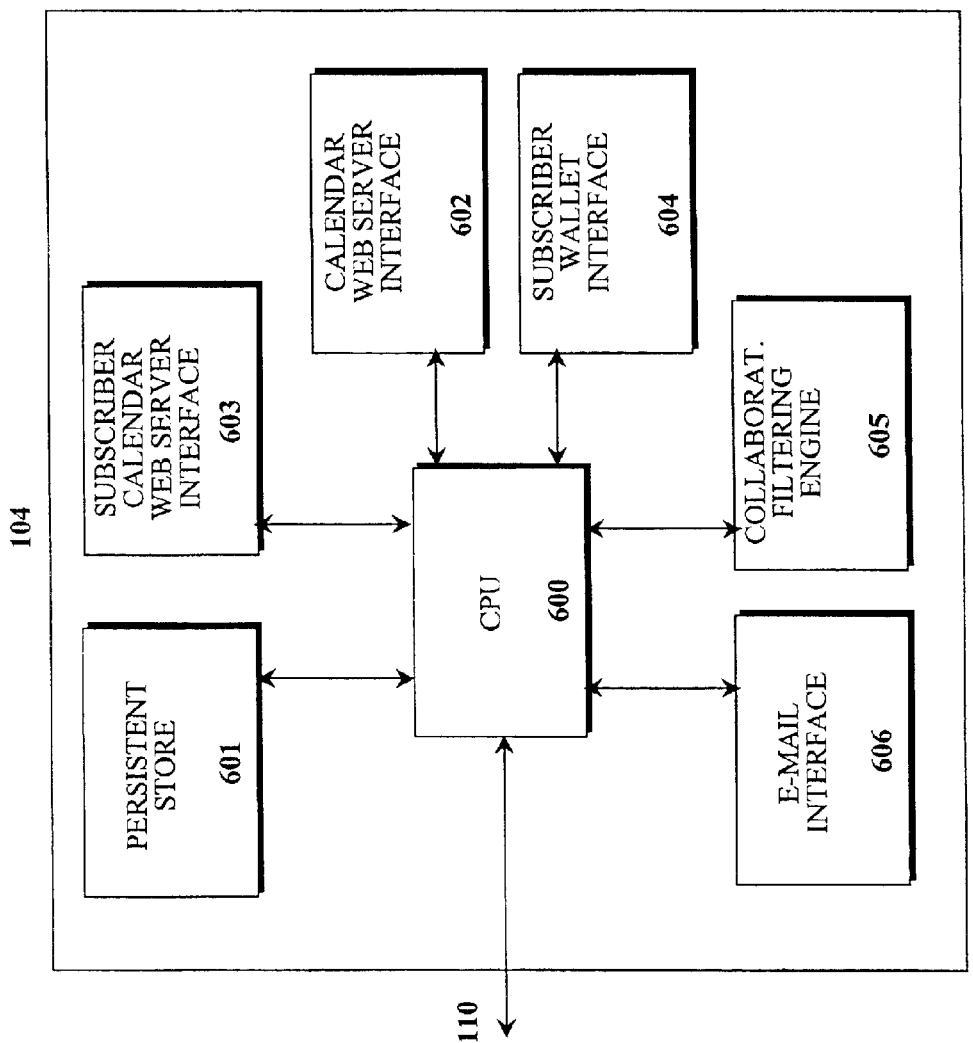
FIG. 5 is a functional block diagram depicting features of a Subscriber Calendar Locator in accordance with an embodiment of the present invention.

FIG. 5 illustrates the main components of Subscriber Calendar Locator 104. Subscriber Calendar Locator 104 comprises CPU 600, which may be linked to the Internet 110 via data link 12. CPU 600 may also be linked to, and controls, the operations of Persistent Store 601, Calendar Web Server Interface 602, Subscriber Calendar Web Server Interface 603, Subscriber Wallet interface 604, Collaborative Filtering Engine 605 and Email Interface 606.

As noted above, Persistent Store 601 may be a memory device, such as a hard drive, wherein information pertaining to Subscriber 25 and Event Publisher 20 is stored. Calendar Web Server interface 602 enables the Subscriber Calendar Locator 104 to communicate with Publisher Web Server 102 via Calendar Web Server 101. Calendar Web Server Interface 602 receives an update message signal corresponding to new and updated event pages from Calendar Web Server 102. Subscriber Calendar Web Server Interface 603 enables Subscriber Calendar Locator 104 to exchange information with the Subscriber Calendar Web Server 106. Subscriber Calendar Web Server Interface 603 transmits update message signals corresponding to new or updated event pages to Subscriber Calendar Web Server 106. Subscriber Wallet Interface 604 enables Subscriber Calendar Locator 104 to communicate with Subscriber's 25 wallet application software to retrieve subscriber's 25 profile information.

Collaborative Filtering Engine 605 maintains historical and statistical data of Subscriber's 25 activities when using system 150. For example, the types of events that Subscriber 25 has an interest in is stored in Collaborative Filtering Engine 605. This information is used for such purposes as to predict the types of event pages Subscriber 25 may have an interested in, and to bring these event pages to the attention of Subscriber 25. Engine 605 also maintains demographic information with respect to Subscriber 25, which may be used for marketing purposes.

Email Interface 606 enables Subscriber Calendar Locator 104 to forward e-mail notification to subscribers. Automatic subscribers may receive e-mail notifying them that their personal calendars have been automatically updated in accordance with an updated event page. Non-automatic subscribers may receive e-mail notifying them that an event page that they have an interest in has been updated. Furthermore, all subscribers may receive e-mail notifying them of unrestricted event pages they do not subscribe to, but may have an interest in.

Figure 6:
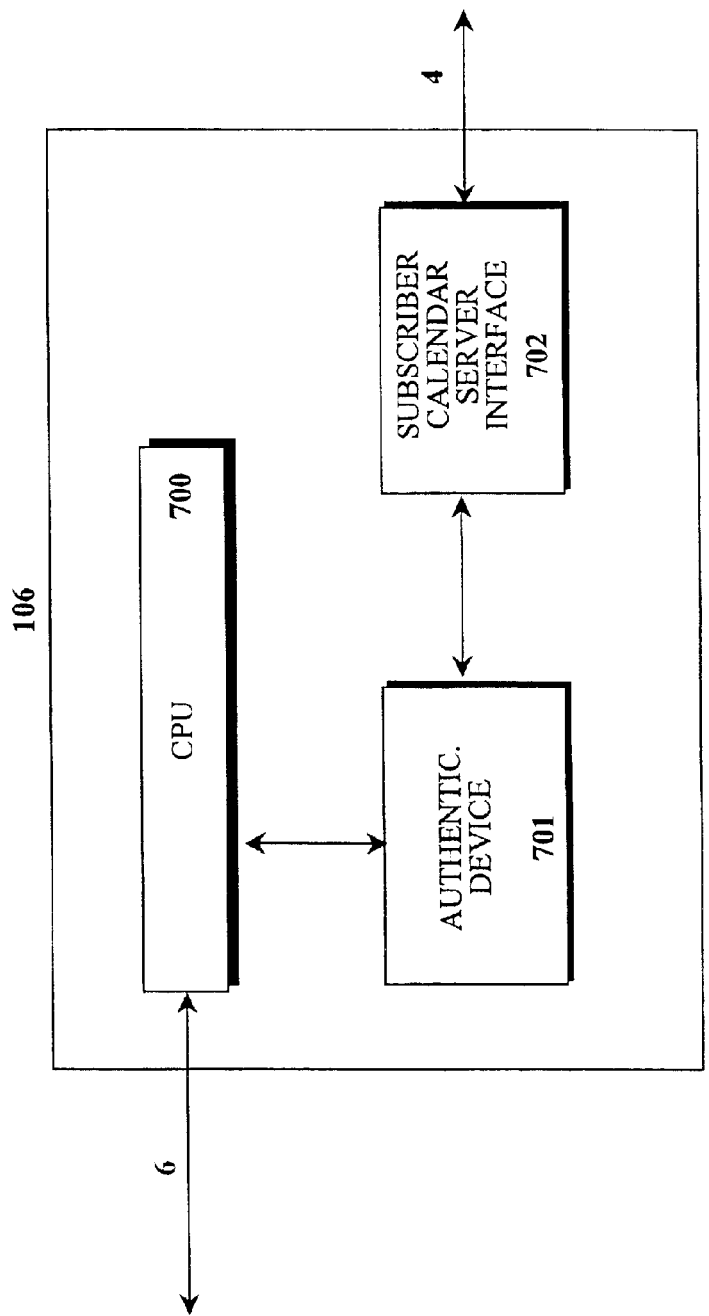
FIG. 6 is a functional block diagram depicting features of a Subscriber Calendar Web Server in accordance with an embodiment of the present invention.

FIG. 6 illustrates the main components of Subscriber Calendar Web Server 106. Subscriber Calendar Web Server 106 comprises CPU 700, which is linked to the Internet 110 via data link 6. CPU 700 is linked to and controls the operations of Authentication Device 701 and Subscriber Calendar Server interface 702. Authentication Device 701 enables Subscriber Calendar Web Server 106 to authenticate that the received update message signal is from the Subscriber Calendar Locator 104. Subscriber Calendar Server interface 702 enables Subscriber Calendar Web Server 106 to forward the received signal to Subscriber Calendar Server 107. Subscriber Calendar Server Interface 702 is linked to Subscriber Calendar Server 107 via data link 4.

Figure 7:
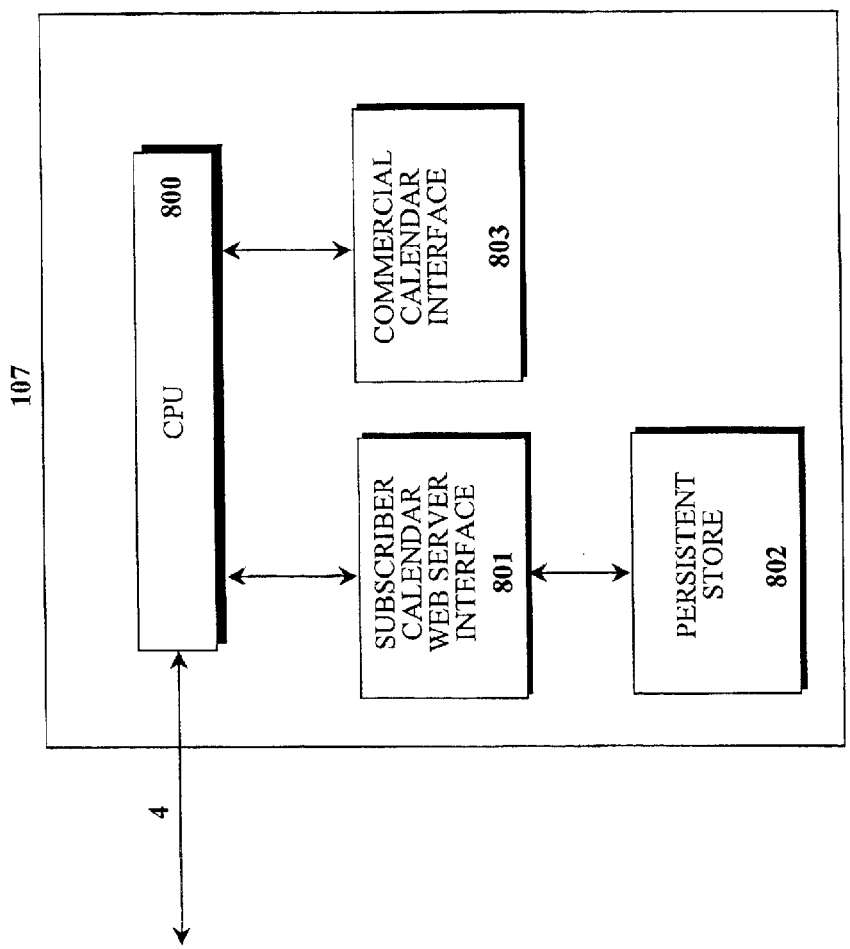
FIG. 7 is a functional block diagram depicting features of a Subscriber Calendar Server in accordance with an embodiment of the present invention.

FIG. 7 illustrates the main components of Subscriber Calendar Server 107. Subscriber Calendar Server 107 comprises CPU 800, which is linked to and controls the operations of Subscriber Calendar Web Server interface 801, Persistent store 802, and Commercial Calendar interface 803. CPU 800 is also linked to Subscriber Calendar Web Server 106 via data link 4.

Subscriber Calendar Web Server interface 801 enables Subscriber Calendar Server 107 to receive the update message signal corresponding to updated Events Page 112 from Subscriber Calendar Locator 104 via Subscriber Calendar Web Server 106, and updates Subscriber Calendar 117 stored in Persistent Store 802. Subscriber Calendar Web Server interface 801 sends a confirmation message signal back to Subscriber Calendar Locator 104, via Subscriber Calendar Web Server 106, confining that Subscriber Calendar 117 has been updated.

If Subscriber 25 utilizes an Internet-linked calendar, such as Microsoft® Outlook™ or Yahoo® Calendar, CPU 800 forwards the update message signal, corresponding to updated Event Page 112, to Commercial Calendar interface 803. Commercial Calendar Interface 803 configures the received signal to correspond to the Internet-linked calendar utilized by Subscriber 25. Commercial Calendar Interface 803 transmits the configured signal to the Internet-linked personal calendar utilized by Subscriber 25, via Server 106 and the Internet 110, directing the corresponding server to edit the Internet-linked calendar in accordance with updated Events Page 112.

Figure 8A:
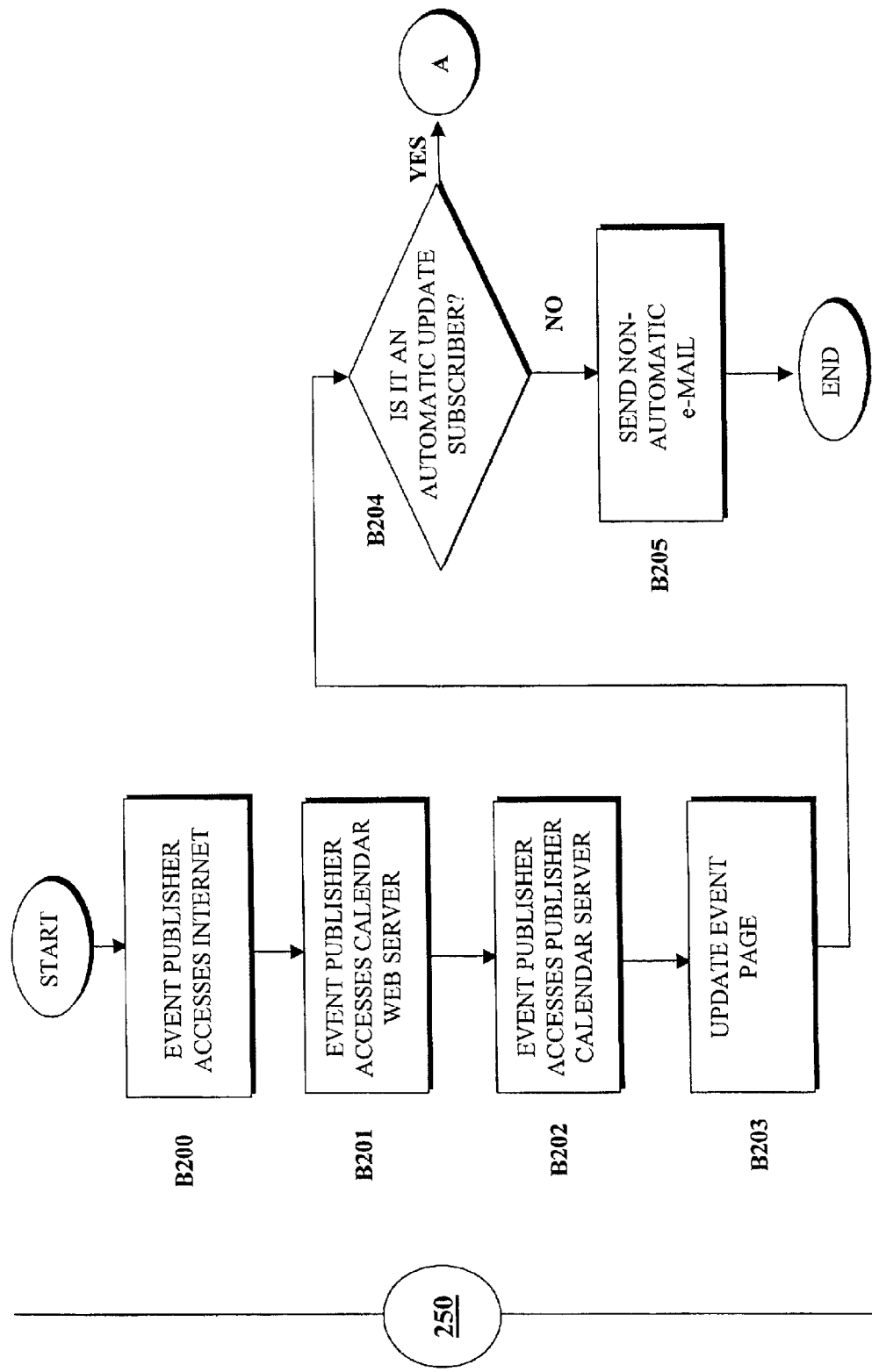
FIGS. 8A–8C are flow charts illustrating a process in accordance with an embodiment of the present invention.
Figure 8B:
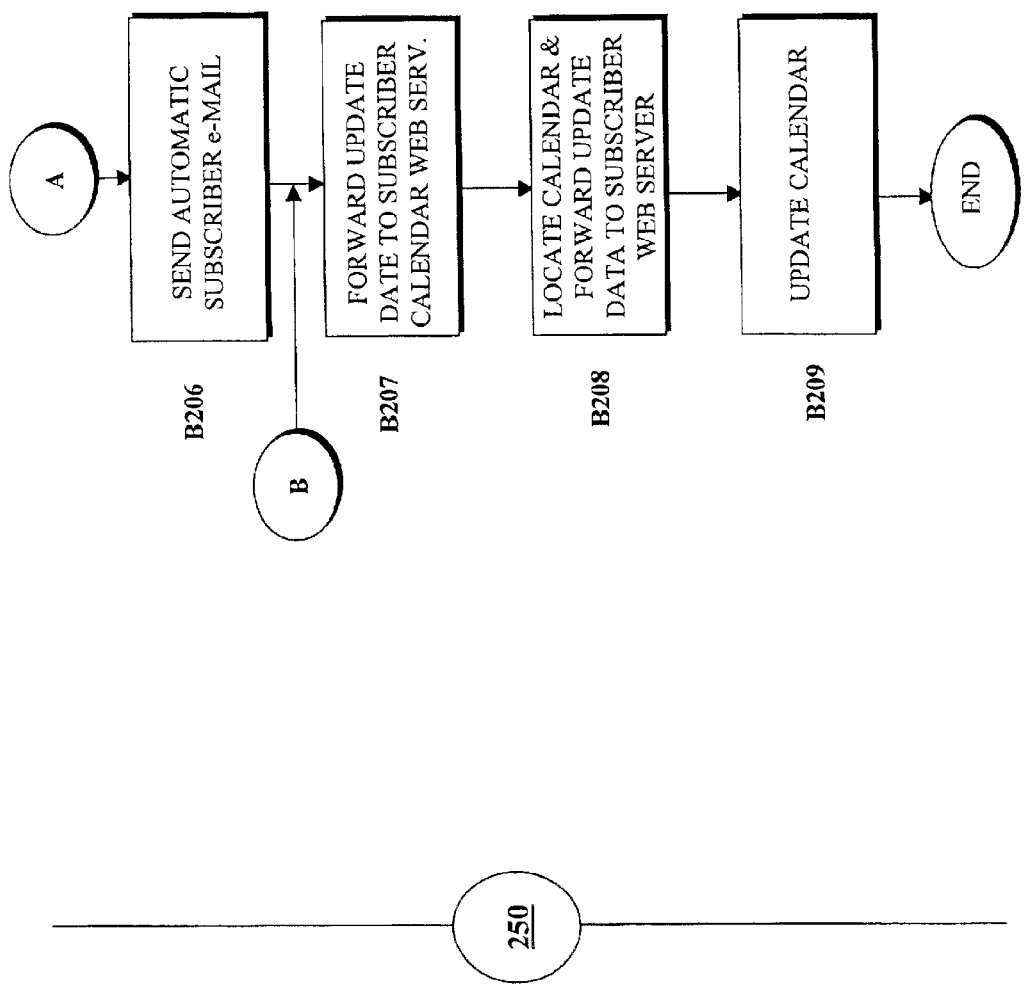

FIGS. 8A, 8B are flow diagrams depicting process 250 effected by system 150. As indicated in FIG. 8A, Event Publisher 20, in block B200, accesses the Internet via Internet access device 110. Upon successfully accessing the Internet, Event Publisher 20, in block B201, accesses the Calendar Web Server 101 using an Internet browser.

In block B202, Event Publisher 20 accesses Publisher Calendar Server 102. This may be achieved by Event Publisher 20 entering a user identification and password to identify himself. In block B203, Event Publisher 20 updates Events page 112.

After the update of Events page 112, process 250, in block B204, determines whether Subscriber 25 is an Automatic subscriber. If Subscriber 25 is a Non-Automatic subscriber, process 250 proceeds to block B205, where Non-Automatic e-mail is forwarded to Subscriber 25. After block B205, process 250 terminates.

However, if Subscriber 25 is an Automatic subscriber, process 250 proceeds to block B206 (FIG. 8B), where Automatic e-mail is forwarded to Subscriber 25. Both Non-Automatic and Automatic e-mail outline the changes in the updated Events Page 112 and are routed to the updated Events Page 112. Automatic e-mail additionally informs Subscriber 25 that his personal calendar has been automatically updated to reflect Event Publisher's 20 updated Events Page 112.

Returning to FIG. 8B, Publish Server 103, in block B207, forwards an update message signal, which includes updated Events Page 112 stored on the Publisher Calendar Server 102, through the Internet 110 via data link 8, to Subscriber Calendar Locator 104. As noted above, Subscriber Calendar Locator 104 may be linked to the Internet via data link 12.

After forwarding the update message signal, Subscriber Calendar Locator 104, in block B208, locates Subscriber Calendar 117 pertaining to Subscriber 25, and updates Subscriber Calendar 117, in block B209. After block B209, process 250 terminates.

Figure 8C:
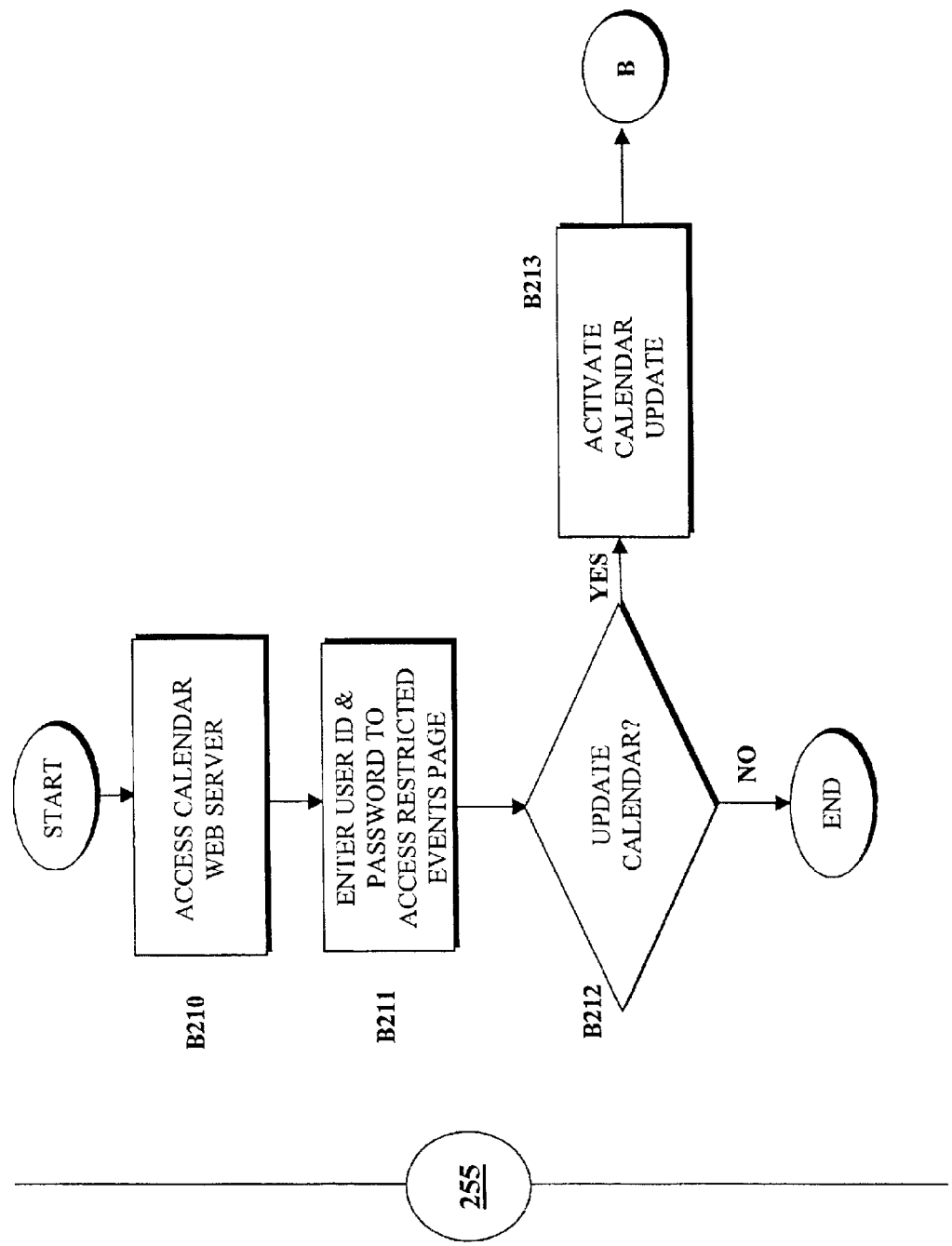

FIG. 8C is a flow diagram depicting process 255. Process 255 represents a Calendar Update Operation, which is performed when Subscriber 25 is a Non-Automatic subscriber, to update Subscriber Calendar 117 or a commercially available Internet-linked calendar, with respect to updated Events Page 112. In block B210, Subscriber 25 accesses Calendar Web Server 101 through the Internet 110 using Internet access device 105.

In block B211, Subscriber 25 enters his user identification and password to view Events Page 112, and/or any other Events Page that he is authorized to access. Additionally, Subscriber 25 may view any unrestricted Events Pages that are accessible to the general public.

After viewing Events Page 112 and/or any other Events Page that are accessible to Subscriber 25, Subscriber 25, in block B212, decides whether to update his Subscriber Calendar 117 to include information pertaining to the events on any or all of the events pages he has viewed. If Subscriber 25 does not desire to update Subscriber Calendar 117, then process 255 terminates.

However, if Subscriber 25 desires to update Subscriber Calendar 117, Subscriber 25, in block B213, initiates the Calendar Update Operation. The Calendar Update Operation is initiated by clicking on the Calendar Update link displayed on the events pages. Process 255 then proceeds to block B207 of process 250 to complete the Calendar Update Operation.

The foregoing description of the present invention provides illustration and description, but is not intended to be exhaustive or to limit the invention to the precise form disclosed. Modifications and variations are possible consistent with the above teachings or may be acquired from practice of the invention. Accordingly, the scope of the invention is defined by the claims and their equivalents.

What is claimed:

1. A system for automatically updating a predetermined personal calendar linked to a network, comprising:
   a first server linked to the network;
   a second server linked to the first server, to store an events page;
   a third server, linked to the first server and the second server to edit the events page;
   a fourth server linked to the network, the fourth server being configured to receive update data from the third server and locate the predetermined personal calendar; and
   a fifth server linked to the network and to the predetermined personal calendar, wherein the fifth server receives the update data from the fourth server, and the fifth server automatically updates the predetermined personal calendar in accordance with the update data.

2. The system of claim 1, wherein the update data includes an updated events page.

3. The system of claim 1, wherein the network is the Internet.

4. The system of claim 1, wherein the fourth server and the fifth server are linked to the network via at least one of a telephone line, a dedicated computer connection, a satellite connection and a cellular telephone network connection.

5. The system of claim 1, wherein the third server and the second server are linked to the first server via a Hyper Text Transfer Protocol link or a Transport Control Protocol link.

6. The system of claim 1, wherein the predetermined personal calendar is stored in a sixth server which is linked to the fifth server.

7. The system of claim 1, wherein the predetermined personal calendar is a commercially available Internet linked calendar.

8. The system of claim 7, wherein the update data is converted to correspond to the commercially available Internet linked calendar.

9. The system of claim 1, wherein the fourth server comprises an e-mail interface, the e-mail interface forwards a message via e-mail that the predetermined personal calendar has been automatically updated in accordance with the update data.

10. The system of claim 1, wherein the fourth server comprises an e-mail interface, the e-mail interface forwards a message via e-mail that the events page has been edited.

11. A method of automatically updating a predetermined personal calendar linked to a network, comprising:
forwarding update data to a locator, wherein the locator is linked to the network;
locating the predetermined personal calendar using subscriber data stored in the locator;
forwarding the update data from the locator to a first server, wherein the first server is linked to the network and linked to the predetermined personal calendar; and
using the update data to automatically update the predetermined personal calendar corresponding to the subscriber data.

12. The method of claim 11, further comprising forwarding an Automatic Subscriber message or a Non-Automatic Subscriber message to subscribers through the network.

13. The method of claim 11, wherein the network is the Internet.

14. The method of claim 11, wherein the predetermined personal calendar is stored in a second server which is linked to the first server.

15. The method of claim 11, wherein the predetermined personal calendar is a commercially available Internet linked calendar.

16. A computer-readable medium encoded with a plurality of processor executable instruction sequences for:
forwarding update data to a locator, wherein the locator is linked to the network;
locating the predetermined personal calendar using subscriber data stored in the locator;
forwarding the update data from the locator to a first server, wherein the first server is linked to the network and linked to the predetermined personal calendar; and
using the update data to automatically update the predetermined personal calendar corresponding to the subscriber data.

17. The computer-readable medium of claim 16, wherein the network is the Internet.

18. The computer-readable medium of claim 16, wherein the predetermined personal calendar is stored in a second server which is linked to the first server.

19. The computer-readable medium of claim 16, wherein the predetermined personal calendar is a commercially available Internet linked calendar.

20. A system for automatically updating a predetermined subscriber personal calendar linked to a network, comprising:
a first server linked to the network to control and operate a publisher calendar website including a link to an events page created by an event publisher;
a second server linked to the first server, to store the events pages;
a third server, linked to the first server and the second server to edit the events page;
a fourth server linked to the network, the fourth server being configured to receive update data related to the events page from the third server and locate the predetermined subscriber personal calendar; and
a fifth server linked to the network and to the predetermined subscriber personal calendar, wherein a subscriber subscribes to receive services from the event publisher, the event publisher instructs the fourth server to transmit the update data to the fifth server if the event publisher determines that the update data is of interest to the subscriber based on an analysis of the personal preferences of the subscriber, the fifth server receives the update data from the fourth server, and the fifth server automatically updates the predetermined subscriber personal calendar in accordance with the update data.

21. The system of claim 20, wherein the update data includes an updated events page.

22. The system of claim 20, wherein the network is the Internet.

23. The system of claim 20, wherein the fourth and the fifth server are linked to the network via at least one of a telephone line, a dedicated computer connection, a satellite connection and a cellular telephone network connection.

24. The system of claim 20, wherein the third server and the second server are linked to the first server via a Hyper Text Transfer Protocol link or a Transport Control Protocol link.

25. The system of claim 20, wherein the predetermined subscriber personal calendar is stored in a sixth server which is linked to the fifth server.

26. The system of claim 20, wherein the predetermined subscriber personal calendar is a commercially available Internet linked calendar.

27. The system of claim 26, wherein the update data is converted to correspond to the commercially available Internet linked calendar.

28. The system of claim 20, wherein the fourth server comprises an e-mail interface, the e-mail interface forwards a message via e-mail that the predetermined subscriber personal calendar has been automatically updated in accordance with the update data.

29. The system of claim 20, wherein the fourth comprises an e-mail interface, the e-mail interface forwards a message via e-mail that the events page has been edited.

30. A method of automatically updating a predetermined subscriber personal calendar linked to a network, comprising:
forwarding update data to a locator, wherein the locator is linked to the network;
locating the predetermined subscriber personal calendar using subscriber data stored in the locator;
forwarding the update data from the locator to a first server, wherein the first server is linked to the network and linked to the predetermined subscriber personal calendar; and
using the update data to update the predetermined subscriber personal calendar corresponding to the subscriber data, wherein a subscriber subscribes to receive services from an event publisher, the event publisher instructs the locator to transmit the update data to the first server if the event publisher determines that the update data is of interest to the subscriber based on an analysis of the personal preferences of the subscriber.

31. The method of claim 30, further comprising forwarding an Automatic Subscriber message or a Non-Automatic Subscriber message to subscribers through the network.

32. The method of claim 30, wherein the network is the Internet.

33. The method of claim 30, wherein the predetermined subscriber personal calendar is stored in a second server which is linked to the first server.

34. The method of claim 30, wherein the predetermined subscriber personal calendar is a commercially available Internet linked calendar.

35. A computer-readable medium encoded with a plurality of processor executable instruction sequences which when executed cause a processor to:

forward update data to a locator, wherein the locator is linked to the network;

locate the predetermined subscriber personal calendar using subscriber data stored in the locator;

forward the update data from the locator to a first server, wherein the first server is linked to the network and linked to the predetermined subscriber personal calendar; and use the update data to update the predetermined subscriber personal calendar corresponding to the subscriber data, wherein a subscriber subscribes to receive services from an event publisher, the event publisher instructs the locator to transmit the update data to the first server if the event publisher determines that the update data is of interest to the subscriber based on an analysis of the personal preferences of the subscriber.

36. The computer-readable medium of claim 35, wherein the network is the Internet.

37. The computer-readable medium of claim 35, wherein the predetermined subscriber personal calendar is stored in a second server which is linked to the first server.

38. The computer-readable medium of claim 35, wherein the predetermined subscriber personal calendar is a commercially available Internet linked calendar.

* * * * *

UNITED STATES PATENT AND TRADEMARK OFFICE
CERTIFICATE OF CORRECTION

PATENT NO.    : 6,823,357 B1
DATED         : November 23, 2004
INVENTOR(S)   : John Du and Rajiv Choudhary It is certified that error appears in the above-identified patent and that said Letters Patent is hereby corrected as shown below:

Column 8,
Line 43, delete "semicolon [;]" after "network" and insert -- to control and operate a publisher calendar website having a link to an events page including a list of events created by an event publisher; --
Line 44, delete "an" between "store" and "events" and replace with -- the --
Line 46, delete "comma [,]" between "server" and "linked"
Line 47, delete "semicolon [;]" after "page" and insert -- and to generate update data corresponding to the edited events page; --

Column 9,
Lines 19 and 20, insert -- generating update data corresponding to an edited events page; -- after "comprising;"
Lines 42 and 43, insert -- generating update data corresponding to an edited events page; -- after "for;"
Line 45, delete "the" between "locating" and "predetermined" and replace with -- a --
Line 65, delete "including" between "website" and "a" and replace with -- having --
Line 66, insert -- including a list of events -- between "page" and "created"

Column 10,
Line 3, delete "comma [,]" between "server" and "linked"
Line 4, delete "semi-colon [;]" after "page" and insert -- and to generate update data corresponding to the edited events page; --
Line 6, delete "related" between "data" and "to" and replace with -- corresponding --
Line 7, insert "edited" before -- events --
Lines 52 and 53, insert "generating update data corresponding to an edited events page;" after -- comprising; --

UNITED STATES PATENT AND TRADEMARK OFFICE
CERTIFICATE OF CORRECTION

PATENT NO. : 6,823,357 B1
DATED : November 23, 2004
INVENTOR(S) : John Du and Rajiv Choudhary It is certified that error appears in the above-identified patent and that said Letters Patent is hereby corrected as shown below:

<u>Column 11,</u>
Lines 18 and 19, insert -- generate update data corresponding to an edited events page; -- after "to;"

Signed and Sealed this

Tenth Day of May, 2005

JON W. DUDAS
*Director of the United States Patent and Trademark Office*